(12) United States Patent
Sasaki et al.

(10) Patent No.: US 11,541,944 B2
(45) Date of Patent: Jan. 3, 2023

(54) VEHICLE

(71) Applicants: TOYOTA JIDOSHA KABUSHIKI KAISHA, Toyota (JP); SUBARU CORPORATION, Tokyo (JP)

(72) Inventors: Akihito Sasaki, Toyota (JP); Ryo Kimura, Shibuya-ku (JP)

(73) Assignees: Toyota Jidosha Kabushiki Kaisha, Toyota (JP); Subaru Corporation, Tokyo (JP)

( * ) Notice: Subject to any disclaimer, the term of this patent is extended or adjusted under 35 U.S.C. 154(b) by 0 days.

(21) Appl. No.: 17/461,259

(22) Filed: Aug. 30, 2021

(65) Prior Publication Data

US 2022/0081039 A1 Mar. 17, 2022

(30) Foreign Application Priority Data

Sep. 14, 2020 (JP) .............................. JP2020-154088

(51) Int. Cl.
*B62D 25/20* (2006.01)
*B62D 21/15* (2006.01)
*B62D 25/02* (2006.01)
*B60J 5/04* (2006.01)

(52) U.S. Cl.
CPC ........ *B62D 25/2036* (2013.01); *B60J 5/0425* (2013.01); *B62D 21/157* (2013.01); *B62D 25/025* (2013.01)

(58) Field of Classification Search
CPC .. B62D 25/025; B62D 25/20; B62D 25/2009; B62D 25/2027; B62D 25/2036; B62D 21/157; B60J 5/042; B60J 5/0423

USPC ............. 296/193.07, 203.01, 203.03, 187.12
See application file for complete search history.

(56) References Cited

U.S. PATENT DOCUMENTS

| 9,969,435 B2 * | 5/2018 | Johnson ............. B62D 25/2036 |
| 11,208,152 B2 * | 12/2021 | Kawase ................ B60L 3/0046 |
| 11,465,689 B2 * | 10/2022 | Murata ................ B62D 27/023 |

FOREIGN PATENT DOCUMENTS

| JP | 2014-124997 A | | 7/2014 | |
| JP | 2017077763 A | * | 4/2017 | ............. B62D 21/15 |

* cited by examiner

*Primary Examiner* — Dennis H Redder
(74) *Attorney, Agent, or Firm* — Finnegan, Henderson, Farabow, Garrett & Dunner, LLP

(57) ABSTRACT

A vehicle includes a vehicle body having a door opening, and a door that is attached to the vehicle body and that has a door reinforcing member extending straddling the door opening. The vehicle body includes: a rocker extending following a lower end of the door opening; a floor panel extending from an upper face of the rocker to a vehicle inward side; a first reinforcing member fixed to an upper face of the floor panel and extends in a vehicle front-rear direction following an end portion of the floor panel, an outward end portion of the first reinforcing member being disposed above the rocker, and an inward end portion of the first reinforcing member being disposed inward of the rocker; and a second reinforcing member that is fixed to an upper face of the first reinforcing member and that extends in a vehicle width direction.

7 Claims, 4 Drawing Sheets

VEHICLE

CROSS-REFERENCE TO RELATED APPLICATION

This application claims priority to Japanese Patent Application No. 2020-154088 filed on Sep. 14, 2020, incorporated herein by reference in its entirety.

BACKGROUND

1. Technical Field

The technology disclosed in the present specification relates to a vehicle.

2. Description of Related Art

Vehicles that travel over a road surface can encounter collisions from various directions, such as frontal collisions, rear-end collisions, broadside collisions, and so forth. Around door openings through which occupants pass when entering and exiting particularly tend to be insufficient with regard to strength as to broadside collisions. A vehicle disclosed in Japanese Unexamined Patent Application Publication No. 2014-124997 (JP 2014-124997 A) has a rocker extending along a lower end of a door opening, and a floor panel fixed to a lower portion of the rocker. The upper face of the rocker and the upper face of the floor panel are connected by a first reinforcing member (e.g., a gusset plate). In a broadside collision, the vehicle according to JP 2014-124997 A transmits the shock load, applied from the outside of the vehicle to the rocker, to the floor panel via the first reinforcing member.

SUMMARY

In a broadside collision, there is concern of a colliding object intruding from the door opening. Providing a door reinforcing member inside of the door is known as a structure to curb such an intrusion. The door reinforcing member extends straddling the door opening, and is configured so as not to pass through the door opening. However, when the load of the broadside collision is relatively great and deformation occurs at the periphery of the door opening, there is concern that the door reinforcing member may enter through the door opening to the inside, allowing the colliding object to intrude. In particular, with a structure described in JP 2014-124997 A, a rocker flange provided on an upper face of a rocker readily deforms by collapsing to the inward side of the vehicle. In the present specification a technology is provided that enables a door reinforcing member to be kept from entering to the inward side of the door opening by suppressing a rocker flange from deforming when the vehicle encounters a broadside collision.

A first aspect disclosed in the present specification is a vehicle. The vehicle includes a vehicle body that has a door opening situated at a side face of the vehicle for entering and exiting, and a door that is attached to the vehicle body and configured to open and close the door opening and that has a door reinforcing member that extends straddling the door opening. The vehicle body includes: a rocker extending following a lower end of the door opening; a floor panel extending from an upper face of the rocker to a vehicle inward side; a first reinforcing member that is fixed to an upper face of the floor panel and extends in a vehicle front-rear direction following an end portion of the floor panel, an outward end portion of the first reinforcing member being disposed above the rocker, and an inward end portion of the first reinforcing member being disposed inward of the rocker; and a second reinforcing member that is fixed to an upper face of the first reinforcing member and that extends in a vehicle width direction. The rocker includes a rocker flange extending upward from the upper face of the rocker, and an outward end portion of the second reinforcing member faces the rocker flange.

In the above-described vehicle, in addition to the first reinforcing member that reinforces the end portion of the floor panel situated in the proximity of the rocker, the second reinforcing member is further provided, fixed on the upper face of the first reinforcing member. The second reinforcing member extends in the vehicle width direction, and the end portion thereof at the vehicle outward side faces the rocker flange. According to the above first aspect, even when the door reinforcing member is pressed into the vehicle body in a broadside collision, the second reinforcing member can suppress the rocker flange from collapsing to the vehicle inward side. Further, due to the second reinforcing member being fixed on the upper face of the first reinforcing member, the load of the broadside collision applied to the rocker including the rocker flange can be transmitted to the floor panel by the first reinforcing member and the second reinforcing member. As a result, the load of the collision applied to the rocker can be transmitted to the floor panel more smoothly.

In the first aspect, the second reinforcing member may be disposed rearward of the lower end of the door opening.

In the first aspect, the vehicle may include a front door that is situated forward of the door on the side face of the vehicle, and the door may be a rear door.

In the first aspect, a rear end of the door reinforcing member may be situated lower than the upper face of the rocker.

In the first aspect, the second reinforcing member may be fixed to the first reinforcing member by at least a first fixing location, a second fixing location, and a third fixing location, the second fixing location may be situated rearward from the first fixing location, and the third fixing location may be situated inward from the first fixing location and the second fixing location, and be situated between the first fixing location and the second fixing location in the vehicle front-rear direction.

In the first aspect, the second reinforcing member may be provided with a step that extends in the vehicle width direction and is displaced in an up-down direction.

In the first aspect, the vehicle may include a floor cross member that protrudes from the upper face of the floor panel and extends from the rocker toward the vehicle inward side, and a front end of the first reinforcing member may be fixed to the floor cross member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
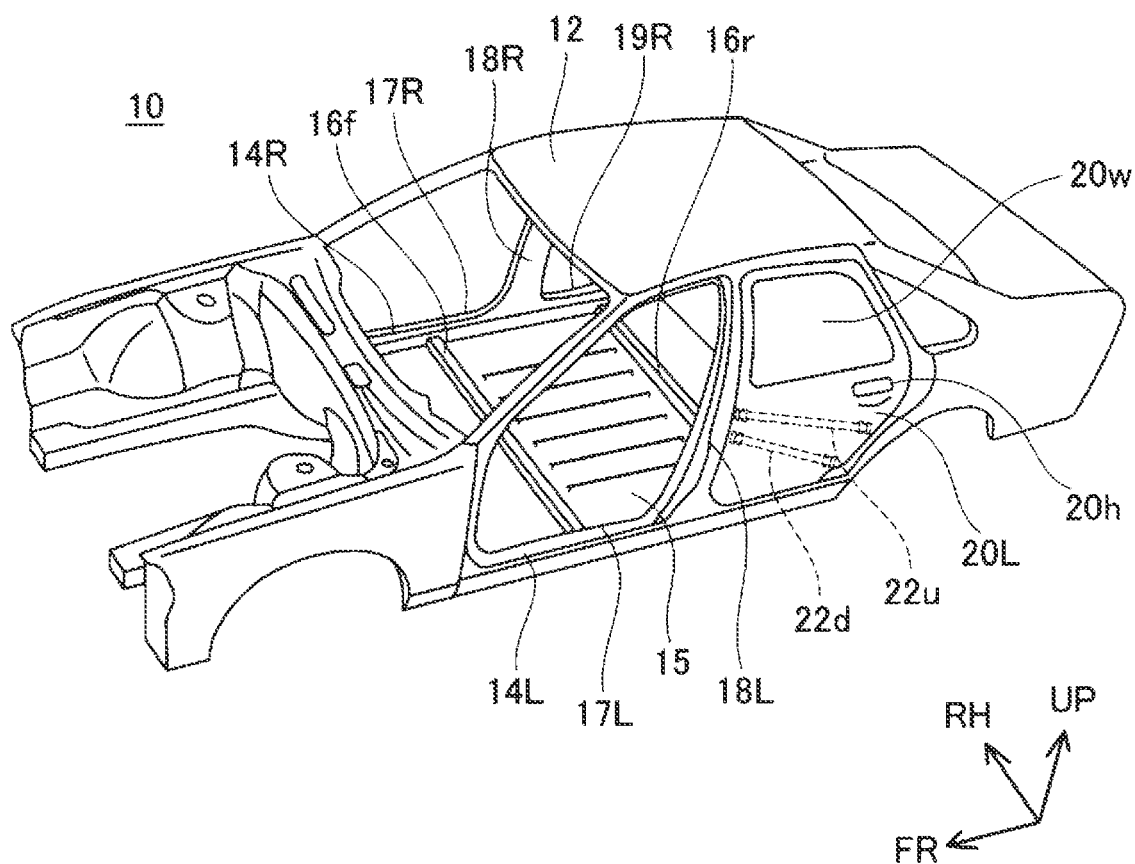
FIG. 1 is a perspective view of a vehicle according to an embodiment.

In an embodiment according to the present technology, a second reinforcing member may be disposed rearward of a lower end of the door opening. The rear of the lower end of the door opening is a location at which the door reinforcing member is readily strongly pushed inward in a broadside collision, and the rocker flange is easily deformed. Providing the second reinforcing member at such a location enables deformation of the rocker flange to be suppressed more effectively.

In the embodiment according to the present technology, the door may be a rear door. That is to say, the vehicle may further include a front door that is situated forward of the rear door on the side face of the vehicle. Note however, that in another embodiment, the present technology may be applied to a vehicle in which one door is provided on the side face.

In the embodiment according to the present technology, a rear end of the door reinforcing member may be situated lower than the rocker. According to this configuration, the rear end of the door reinforcing member can be effectively suppressed from entering through the door opening to the inside in a broadside collision, due to the rocker flange reinforced by the second reinforcing member.

In the embodiment according to the present technology, the second reinforcing member may be fixed to the first reinforcing member in at least a first fixing location, a second fixing location, and a third fixing location. In this case, the second fixing location may be situated rearward from the first fixing location. Also, the third fixing location may be situated on the vehicle inward side as to the first fixing location and the second fixing location, and be situated between the first fixing location and the second fixing location with regard to the vehicle front-rear direction. According to this combination of fixing locations, the second reinforcing member does not readily rotate centered about the first fixing location or the second fixing location in a broadside collision, due to the third fixing location situated at the vehicle inward side in particular. As a result, the second reinforcing member can transmit the load of a broadside collision to the floor panel even more readily.

In the embodiment according to the present technology, the second reinforcing member may be provided with a step that extends in the vehicle width direction and is displaced in an up-down direction. Providing the step to the second reinforcing member improves the strength of the second reinforcing member as to a load in the vehicle width direction. As a result, the second reinforcing member can transmit the load of a broadside collision to the floor panel more readily.

In the embodiment according to the present technology, the vehicle may include a floor cross member that protrudes from the upper face of the floor panel and extends from the rocker toward the vehicle inward side. In this case, the front end of the first reinforcing member may be fixed to the floor cross member. According to this configuration, the collision load applied to the rocker can be transmitted to the floor panel not only through the first reinforcing member and the second reinforcing member, but further through the floor cross member.

EMBODIMENT

A vehicle according to an embodiment will be described with reference to the drawings. A vehicle 10 according to the embodiment will be described with reference to FIG. 1. The vehicle 10 is a vehicle that travels over a road surface. The vehicle 10 has a vehicle body 12 and a left-side rear door 20L. The vehicle 10 also has four wheels, a traction motor, right and left front doors, and a right rear door, although omitted from illustration. The vehicle 10 is an electric vehicle that travels by driving the wheels by the traction motor, although this is not limiting in particular. Note that in the present specification, the direction FR in the drawings indicates forward in the front-rear direction (vehicle-length direction) of the vehicle 10, and the direction RR indicates rearward in the front-rear direction of the vehicle 10. Also, the direction LH indicates leftward in the right-left direction (vehicle-width direction) of the vehicle 10, and the direction RH indicates rightward in the right-left direction of the vehicle 10. The direction UP indicates upward in the up-down direction (vehicle-height direction) of the vehicle 10, and the direction DN indicates downward in the up-down direction of the vehicle 10. Note that in the present specification, the front-rear direction, the right-left direction, and the up-down direction, of the vehicle 10 may be referred to simply as the front-rear direction, the right-left direction, and the up-down direction, respectively.

As illustrated in FIG. 1, the vehicle body 12 is provided with a pair of rockers 14R and 14L, a pair of center pillars 18R and 18L, a floor panel 15, a front-side floor cross member 16f, and a rear-side floor cross member 16r. The rockers 14R and 14L extend in the front-rear direction at both of the right and left sides of the vehicle body 12. The rockers 14R and 14L are structural members that protect a cabin of the vehicle 10. When the vehicle 10 encounters a frontal collision, a broadside collision, a rear-end collision, or the like, the load thereof is firstly applied to the rockers 14R and 14L.

The center pillars 18R and 18L extend in the up-down direction at the right and left sides of the vehicle body 12, around the middle thereof in the front-rear direction. The center pillars 18R and 18L are also structural members that protect the cabin of the vehicle 10, in the same way as the rockers 14R and 14L. A right-side front door opening 17R and a left-side front door opening 17L are respectively provided forward of the center pillars 18R and 18L. The right-side front door opening 17R and the left-side front door opening 17L are openings through which occupants enter to and exit from front seats of the vehicle 10. In the same way, a right-side rear door opening 19R and a left-side rear door opening 19L (see FIG. 2) are respectively provided rearward of the center pillars 18R and 18L. The right-side rear door opening 19R and a left-side rear door opening 19L are openings through which occupants enter to and exit from rear seats of the vehicle 10.

Four doors are attached to the vehicle body 12, to cover the respective door openings. In FIG. 1, only the left-side rear door 20L that covers the left-side rear door opening 19L (see FIG. 2) is illustrated to facilitate understanding of the inner structure of the vehicle 10, and other doors are omitted from illustration. The left-side rear door 20L is pivotably held on a hinge (omitted from illustration) of the vehicle body 12 by a hinge hook 26L (see FIG. 3) provided to the front side thereof. A window 20w is provided to the upper portion of the left-side rear door 20L, and a door handle 20h is disposed at the rear portion of the left-side rear door 20L. An occupant entering the rear seats of the vehicle 10 opens the left-side rear door 20L by pulling the door handle 20h outwards. Thus, the left-side rear door opening 19L is opened.

Disposed inside the left-side rear door 20L are an upper-side door reinforcing member 22u and a lower-side door reinforcing member 22d. As illustrated in FIG. 1, the upper-side door reinforcing member 22u and the lower-side door reinforcing member 22d both extend in the front-rear direction of the vehicle 10 (i.e., in the right-left direction in the plane of the drawing in FIG. 1). The upper-side door reinforcing member 22u and the lower-side door reinforcing member 22d both are inclined upward in the forward direction. The lower-side door reinforcing member 22d extends so as to intersect with the rocker 14L. The rear end of the lower-side door reinforcing member 22d is situated lower than the rocker 14L. The upper-side door reinforcing member 22u and the lower-side door reinforcing member 22d are both reinforcing members configured of pipe material, and are welded to an outer panel (omitted from illustration) of the left-side rear door 20L. When encountering a broadside collision from the left side of the vehicle 10, the upper-side door reinforcing member 22u and the lower-side door reinforcing member 22d transmit the collision load to the vehicle body 12 (i.e., to the floor panel 15, the rocker 14L, the center pillar 18L, and so forth). The upper-side door reinforcing member 22u and the lower-side door reinforcing member 22d may also both be referred to as "impact beams".

The floor panel 15 is a sheet-metal part that forms the floor of the cabin of the vehicle 10, and extends in the front-rear direction and the right-left direction. The front-side floor cross member 16f and the rear-side floor cross member 16r that extend in the right-left direction (i.e., vehicle width direction) are disposed on the upper face of the floor panel 15. The front-side floor cross member 16f and the rear-side floor cross member 16r protrude from the upper face of the floor panel 15. The right-side tips of the front-side floor cross member 16f and the rear-side floor cross member 16r are connected to the right-side rocker 14R. The left-side tips of the front-side floor cross member 16f and the rear-side floor cross member 16r are connected to the left-side rocker 14L. That is to say, the front-side floor cross member 16f and the rear-side floor cross member 16r connect the rockers 14R and 14L. Accordingly, the front-side floor cross member 16f and the rear-side floor cross member 16r can improve the stiffness of the vehicle 10 around the floor.

Figure 2:
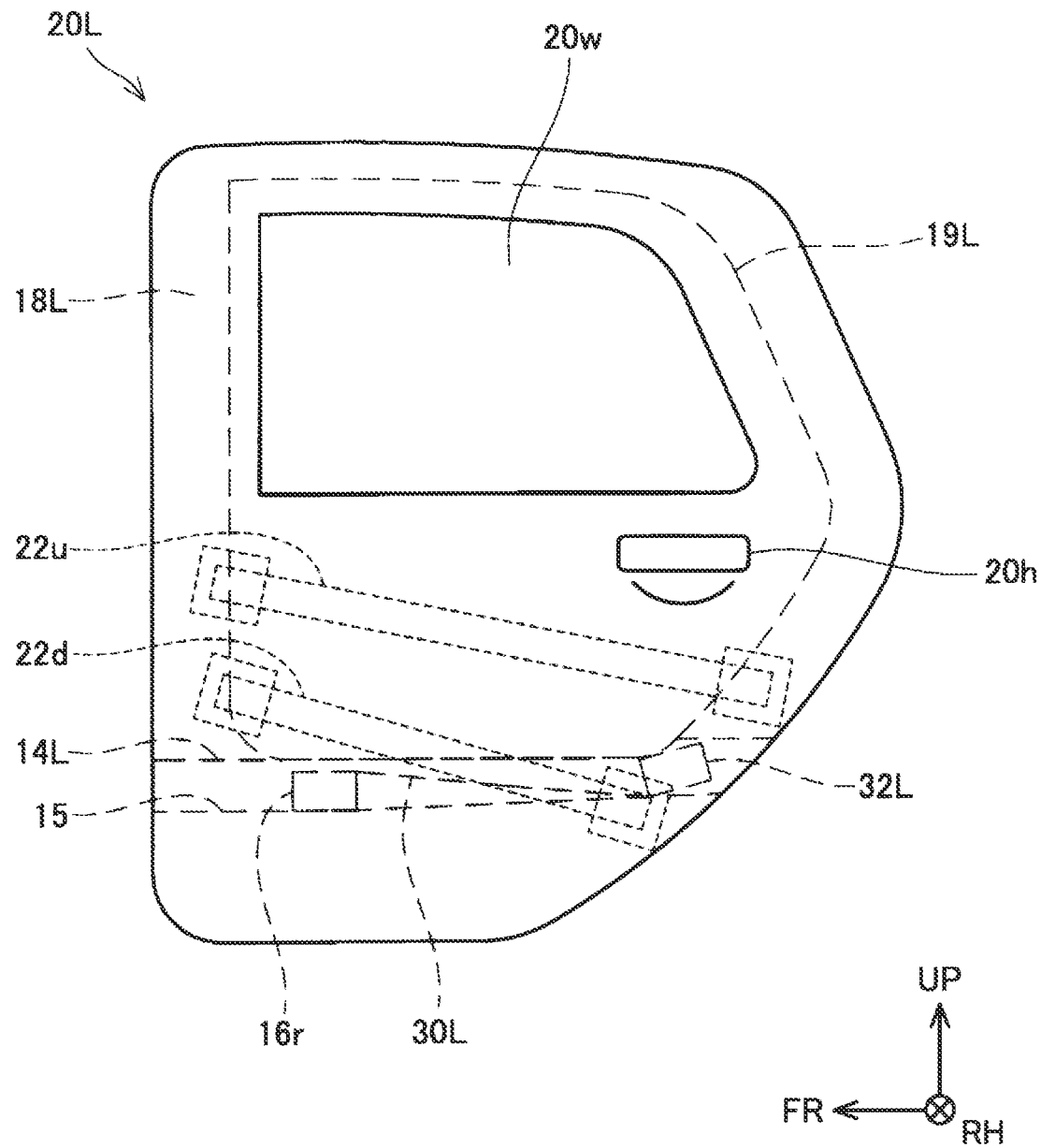
FIG. 2 is a side view, viewing a left-side rear door of the vehicle from the outward side.

The positional relation between the left-side rear door 20L and the left-side rear door opening 19L will be described with reference to FIG. 2. FIG. 2 is a side view of the vehicle 10, showing the shape of the left-side rear door 20L as viewed from the outward side of the vehicle. The left-side rear door 20L covers the entire perimeter of the left-side rear door opening 19L. The lower end of the left-side rear door opening 19L is configured of the upper end of the rocker 14L. That is to say, the rocker 14L extends in the front-rear direction following the lower end of the left-side rear door opening 19L. FIG. 2 shows the upper end of the rocker 14L by a dashed line. The floor panel 15 extends in the front-rear direction below the upper end of the rocker 14L. The rear-side floor cross member 16r is disposed toward the front of the lower end of the left-side rear door opening 19L. The rear-side floor cross member 16r extends in the right-left direction, and is connected to the rocker 14L, as described earlier. The upper face of the rear-side floor cross member 16r and the floor panel 15 are connected by a first reinforcing member 30L that extends in the front-rear direction. The front end of the first reinforcing member 30L is fixed to the upper face of the rear-side floor cross member 16r, and the rear end thereof is fixed to the upper face of the floor panel 15. A second reinforcing member 32L is disposed rearward of the lower end of the left-side rear door opening 19L.

The front end of the left-side rear door opening 19L is configured of the rear end of the center pillar 18L. The upper end and the rear end of the left-side rear door opening 19L are configured of the main portion of the vehicle body 12. That is to say, the left-side rear door opening 19L is formed of the structure of the vehicle body 12.

The upper-side door reinforcing member 22u and the lower-side door reinforcing member 22d fixed inside the left-side rear door 20L extend from the front end portion to the rear end portion of the left-side rear door 20L. The upper-side door reinforcing member 22u and the lower-side door reinforcing member 22d extend straddling the left-side rear door opening 19L. The left-side rear door 20L is configured of an outer panel provided on the outward side, and an inner panel 20p (see FIG. 3) fixed on the inward side thereof. The outer panel and the inner panel 20p are both sheet-metal parts, and readily deform under a load from the outward side (i.e., from the side face of the vehicle 10) in particular. When the vehicle 10 encounters a broadside collision, and a collision load is applied to the left-side rear door 20L from the side face, the upper-side door reinforcing member 22u and the lower-side door reinforcing member 22d that extend straddling the left-side rear door opening 19L transmit the collision load to the vehicle body 12. As a result, the collision energy is absorbed by the vehicle body 12, and accordingly the colliding object can be suppressed from passing through the left-side rear door opening 19L and entering the cabin of the vehicle 10.

A structure for fixing the first reinforcing member 30L and the second reinforcing member 32L to the vehicle body 12 will be described with reference to FIGS. 3 and 4. First, the shape of the rocker 14L will be described with reference to FIG. 4. The rocker 14L is configured of a rocker inner 40 and a rocker outer 42. The rocker 14L has a rectangularly closed cross-sectional form by the rocker inner 40 and the rocker outer 42 being welded together. The rocker inner 40 is opened to the outward side, and has flanges on the upper and lower ends that extend in the up-down direction. In the same way, the rocker outer 42 is opened to the inward side, and has flanges on the upper and lower ends that extend in the up-down direction. The rocker inner 40 and the rocker outer 42 are welded to each other in a state with the flanges abutting each other. As a result, a rocker flange 14f that extends upward is formed on a rocker upper face 14u, which is the upper face of the rocker 14L, as illustrated in FIG. 4. Note that in the vehicle 10 (see FIG. 1), various interior members are disposed as to the vehicle body 12 and the left-side rear door 20L. However, these interior members are primarily made of resin, and accordingly have lower stiffness as compared to the vehicle body 12 and the left-side rear door 20L that are primarily made of sheet metal. Accordingly, the interior members contribute little in a broadside collision. Thus, the interior members fixed to the vehicle body 12 and the left-side rear door 20L are omitted from illustration in FIGS. 3 through 5.

The outward-side end portion of the floor panel 15 is fixed to the rocker upper face 14u of the rocker inner 40. The floor panel 15 extends toward the inward side of the vehicle 10 from the rocker upper face 14u (see FIG. 1). The first reinforcing member 30L is fixed to the upper face of the floor panel 15. The first reinforcing member 30L extends in the vehicle front-rear direction following the rocker 14L, as illustrated in FIG. 3. The front end of the first reinforcing member 30L is fixed to the upper face of the rear-side floor cross member 16r following the vehicle width direction. The outward-side end portion of the first reinforcing member 30L is fixed to the upper face of the outward-side end portion of the floor panel 15, above the rocker 14L, as illustrated in FIG. 4. The first reinforcing member 30L extends in the vehicle front-rear direction, following the outward-side end portion of the floor panel 15, as illustrated in FIG. 3. The inward-side end portion of the first reinforcing member 30L is fixed to the upper face of the floor panel 15. The inward-side end portion of the first reinforcing member 30L is fixed to the upper face of the floor panel 15 further to the inward side of the vehicle than the rocker 14L. Thus, the first reinforcing member 30L joins the rocker 14L, the rear-side floor cross member 16r, and the floor panel 15 to each other. Accordingly, the first reinforcing member 30L is capable of transmitting collision load applied to the rocker 14L and the rear-side floor cross member 16r to the floor panel 15, when encountering a broadside collision.

Figure 3:
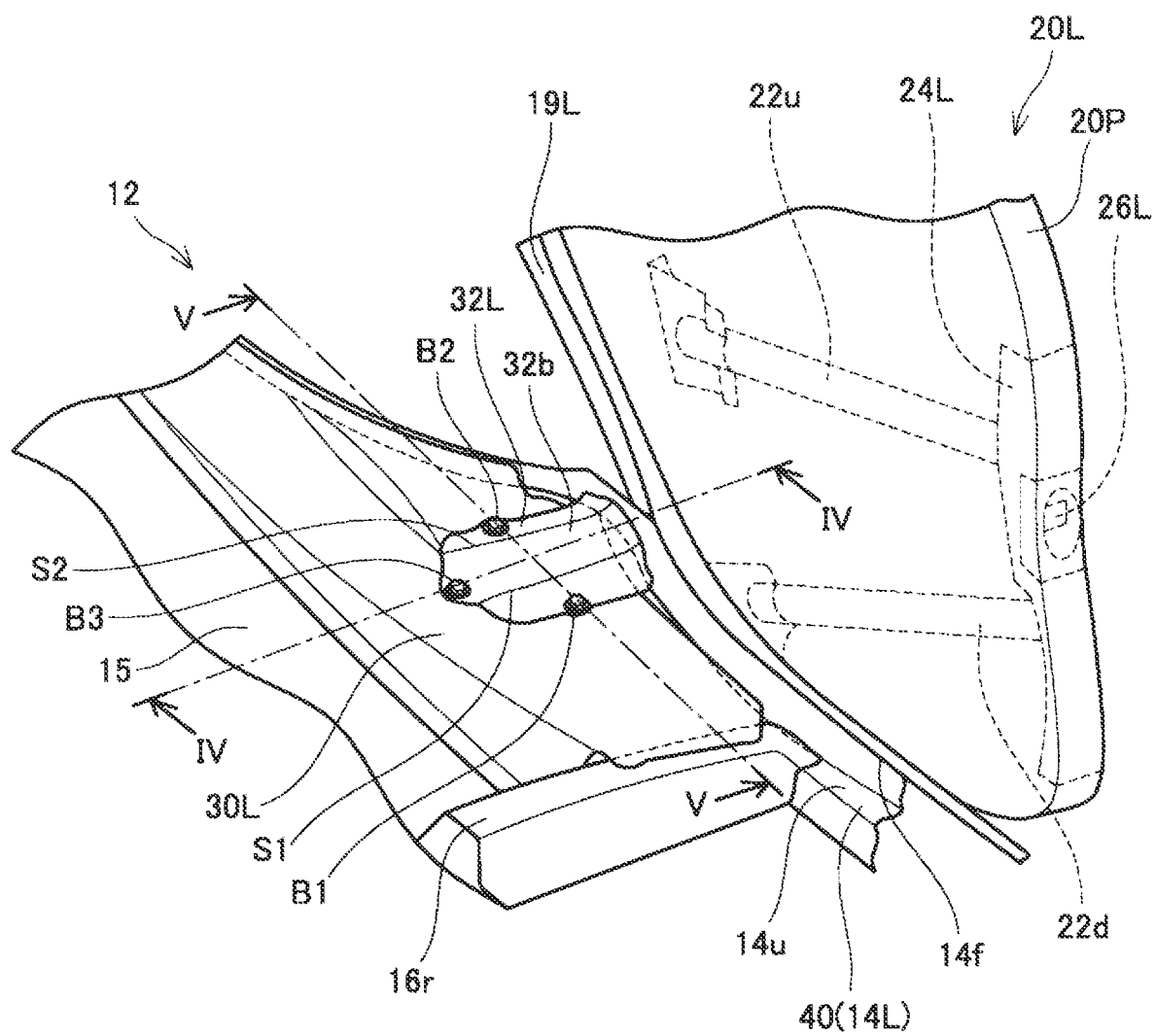
FIG. 3 is a perspective view of forms in the proximity of a rear portion of the left-side rear door, as viewed from the inward side of the vehicle according to the embodiment.
Figure 3:
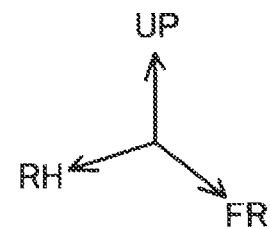
Figure 4:
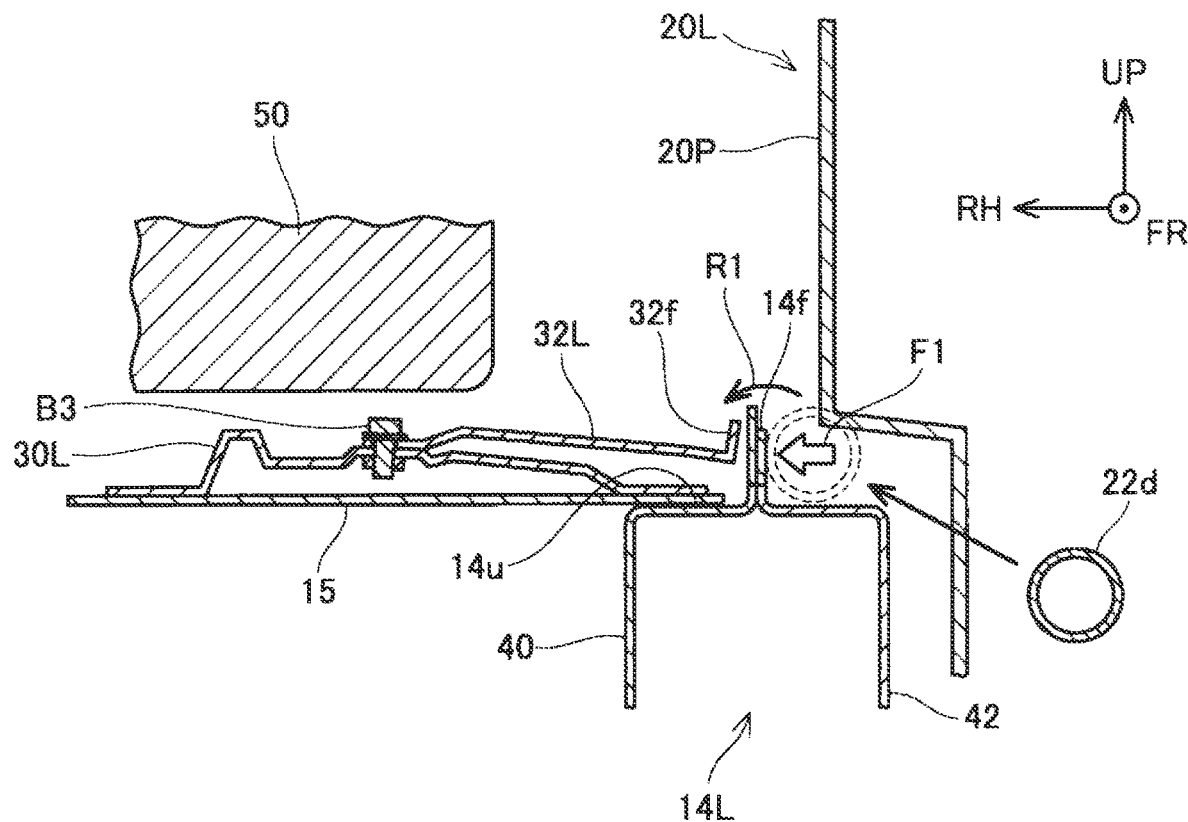
FIG. 4 is a cross-sectional view, taken along line IV-IV in FIG. 3.

The second reinforcing member 32L is further fixed on the upper face of the first reinforcing member 30L, as illustrated in FIG. 3. The second reinforcing member 32L is fixed to an outward-side end portion of the upper face of the first reinforcing member 30L, and a middle portion in the front-rear direction thereof. The second reinforcing member 32L is fixed to the upper face of the first reinforcing member 30L by a first bolt B1, a second bolt B2, and a third bolt B3. The first bolt B1 fixes the second reinforcing member 32L to the first reinforcing member 30L at a first fixing location. The second bolt B2 fixes the second reinforcing member 32L to the first reinforcing member 30L at a second fixing location. The third bolt B3 fixes the second reinforcing member 32L to the first reinforcing member 30L at a third fixing location. The second fixing location at which the second bolt B2 is disposed is at a position rearward from the first fixing location at which the first bolt B1 is disposed. The third fixing location at which the third bolt B3 is disposed is at a position inward from the first fixing location and the second fixing location. The third fixing location is situated generally at the middle between the first fixing location and the second fixing location in the front-rear direction.

The end portion of the second reinforcing member 32L at the inward side of the vehicle is fixed by the third bolt B3, as illustrated in FIG. 4. The second reinforcing member 32L extends from the vehicle inward-side end portion, fixed by the third bolt B3, in the left direction (i.e., in the right direction in the plane of the drawing in FIG. 4) toward the rocker flange 14f. That is to say, the second reinforcing member 32L extends in the vehicle width direction. A reinforcing flange 32f is provided at the outward-side end portion of the second reinforcing member 32L. The reinforcing flange 32f extends upward from the outward-side end portion of the second reinforcing member 32L, and faces the rocker flange 14f.

The lower end of the left-side rear door opening 19L is configured of the upper end of the rocker 14L, as described earlier. That is to say, the lower end of the left-side rear door opening 19L is configured of the rocker flange 14f, as illustrated in FIG. 3. The left-side rear door opening 19L is gradually displaced upward from the rear portion of the lower end thereof. At the rear portion of the lower end of the left-side rear door opening 19L, the rocker flange 14f of the rocker 14L is displaced upwards following the left-side rear door opening 19L, and linearly extends rearward, as illustrated in FIG. 3. At the rear portion of the lower end of the left-side rear door opening 19L, the rocker flange 14f is separated from the left-side rear door opening 19L that continues to be displaced upward. The rear portion of the left-side rear door opening 19L is configured of the vehicle body 12.

The second reinforcing member 32L is disposed facing the portion where the rocker flange 14f and the left-side rear door opening 19L are separated, as illustrated in FIG. 3. Further, the left-side rear door 20L is disposed on the outward side of the left-side rear door opening 19L. The upper-side door reinforcing member 22u and the lower-side door reinforcing member 22d are disposed on the outward side of the inner panel 20p of the left-side rear door 20L. The lower-side door reinforcing member 22d extends past the lower end of the left-side rear door opening 19L, as illustrated in FIG. 3. The front ends of the upper-side door reinforcing member 22u and the lower-side door reinforcing member 22d are fixed to a hinge panel 24L. The hinge hook 26L is provided to the hinge panel 24L at the middle portion thereof in the up-down direction. A hinge (omitted from illustration) disposed in the vehicle body 12 is passed through the hinge hook 26L. The left-side rear door 20L is opened and closed, centered about this hinge, thereby opening and closing the left-side rear door opening 19L.

When the vehicle 10 (see FIG. 1) encounters a broadside collision from the left side (i.e., from the right side in the plane of the drawing in FIG. 4), a situation may occur in which the periphery of the left-side rear door opening 19L of the vehicle body 12 is deformed, and the lower-side door reinforcing member 22d moves along the side face of the rocker outer 42 of the rocker 14L. In this case, the lower-side door reinforcing member 22d moves to above the rocker 14L, as illustrated by dashed lines in FIG. 4. In a broadside collusion, the lower-side door reinforcing member 22d faces the outward-side face of the rocker flange 14f. At this time, the lower-side door reinforcing member 22d applies a collision load F1 to the rocker flange 14f. The rocker flange 14f extends upward, and the upper end is free. Accordingly, when the collision load F1 is applied from the outward side, the rocker flange 14f readily deforms with the upper end collapsing to the inward side.

As illustrated in FIG. 4, the reinforcing flange 32f of the second reinforcing member 32L is disposed on the inward side of the rocker flange 14f. The second reinforcing member 32L extends in the vehicle width direction as described above, and does not readily deform under the collision load F1 applied in the vehicle width direction. In the vehicle 10 according to the embodiment (see FIG. 1), the second reinforcing member 32L is disposed facing the rocker flange 14f, thereby suppressing the upper end of the rocker flange 14f from collapsing to the inward side. As a result, the lower-side door reinforcing member 22d does not readily enter through the left-side rear door opening 19L to the inside. A rear seat 50 is disposed on the inward side of the left-side rear door opening 19L. An occupant of the vehicle 10 is seated on the rear seat 50. The occupant seated on the rear seat 50 can be protected, by the second reinforcing member 32L making entry of the lower-side door reinforcing member 22d through the left-side rear door opening 19L to the inside difficult. As described earlier, the collision load in a broadside collision is first applied to the rocker 14L. In the vehicle 10 according to the embodiment, extending the floor panel 15, the first reinforcing member 30L, and the second reinforcing member 32L toward the rocker 14L enables the collision load F1 applied to the rocker 14L to be transmitted to the vehicle body 12 through these three members. Accordingly, local concentration of the load can be reduced, and also the energy of the collision can be absorbed by the three members.

Figure 5:
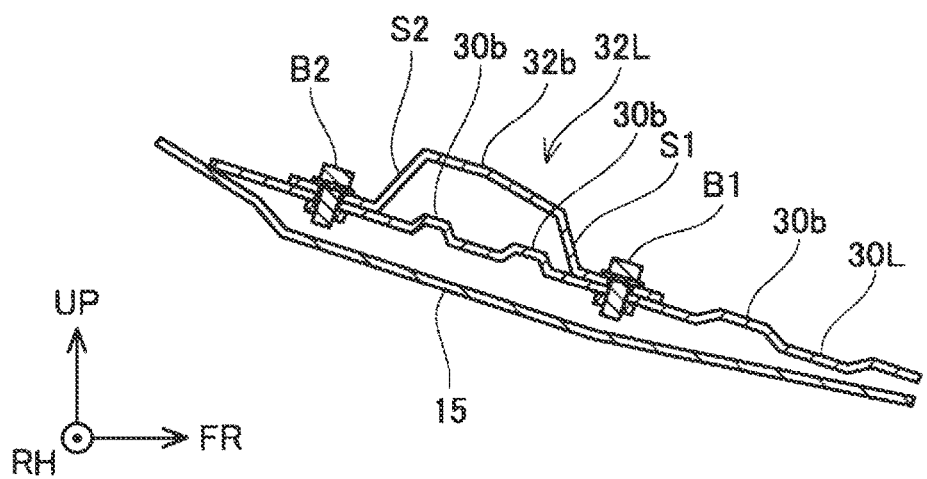
FIG. 5 is a cross-sectional view, taken along line V-V in FIG. 3.

Further, a second bead 32*b* that extends in the right-left direction is provided to the second reinforcing member 32L at the middle portion thereof in the front-rear direction, as illustrated in FIGS. 3 and 5. The second bead 32*b* has steps S1 and S2 displaced in the up-down direction, as illustrated in FIG. 5. The steps S1 and S2 extend in the right-left direction (i.e., in the vehicle width direction), as illustrated in FIG. 3. The second bead 32*b* is not readily deformed under a load in the vehicle width direction. Providing the second bead 32*b* to the second reinforcing member 32L so as to extend in the vehicle width direction can suppress deformation of the second reinforcing member 32L under the collision load F1 that the lower-side door reinforcing member 22*d* applies to the rocker flange 14*f*. Accordingly, the second reinforcing member 32L can readily transmit the collision load F1 to the first reinforcing member 30L. Further, the first reinforcing member 30L is also provided with three first beads 30*b*, as illustrated in FIG. 5. The first beads 30*b* can suppress deformation of the first reinforcing member 30L, in the same way as with the second bead 32*b* provided to the second reinforcing member 32L.

Points of attention of the embodiment will be described below. The first reinforcing member 30L and the second reinforcing member 32L described above are disposed at the left-side rear door opening 19L, but are not limited to this, and may be disposed in the periphery of the left-side front door opening 17L, for example. In this case, the position at which the second reinforcing member is disposed may be changed in accordance with the positional relation of the door reinforcing members disposed in the left-side front door. Further, while the second reinforcing member 32L is described above as being fixed to the upper face of the first reinforcing member 30L at three fixing locations, fixation may be performed by welding, or being fixed at four fixing locations. Also, a second reinforcing member not provided with the second bead 32*b* may be employed. The front end of the first reinforcing member 30L is fixed to the rear-side floor cross member 16*r* in the embodiment, but this is not limiting, and the front end of the first reinforcing member 30L may be fixed to the floor panel 15.

Although a specific example of the disclosure has been described above in detail, these are only exemplifications, and do not limit CLAIMS. The technology set forth in CLAIMS includes various modifications and alterations of the specific example exemplified above. Technical elements described in the present specification or the drawings exhibit technical utility, either singularly or through various types of combinations, and do not limit combinations set forth in CLAIMS at the time of application. Also, the technology exemplified in the present specification or the drawings may achieve a plurality of objects simultaneously, and achieving one of these objects in itself has technical utility.

What is claimed is:

1. A vehicle comprising:
   a vehicle body that has a door opening situated at a side face of the vehicle for entering and exiting; and
   a door that is attached to the vehicle body and configured to open and close the door opening, and that has a door reinforcing member that extends straddling the door opening, wherein:
   the vehicle body includes:
   a rocker extending following a lower end of the door opening;
   a floor panel extending from an upper face of the rocker to a vehicle inward side;
   a first reinforcing member that is fixed to an upper face of the floor panel and extends in a vehicle front-rear direction following an end portion of the floor panel, an outward end portion of the first reinforcing member being disposed above the rocker, and an inward end portion of the first reinforcing member being disposed inward of the rocker; and
   a second reinforcing member that is fixed to an upper face of the first reinforcing member and that extends in a vehicle width direction;
   the rocker includes a rocker flange extending upward from the upper face of the rocker; and
   an outward end portion of the second reinforcing member faces the rocker flange.

2. The vehicle according to claim 1, wherein the second reinforcing member is disposed rearward of the lower end of the door opening.

3. The vehicle according to claim 1, further comprising a front door that is situated forward of the door on the side face of the vehicle, wherein the door is a rear door.

4. The vehicle according to claim 1, wherein a rear end of the door reinforcing member is situated lower than the upper face of the rocker.

5. The vehicle according to claim 1, wherein:
   the second reinforcing member is fixed to the first reinforcing member by at least a first fixing location, a second fixing location, and a third fixing location;
   the second fixing location is situated rearward from the first fixing location; and
   the third fixing location is situated inward from the first fixing location and the second fixing location, and is situated between the first fixing location and the second fixing location in the vehicle front-rear direction.

6. The vehicle according to claim 1, wherein the second reinforcing member is provided with a step that extends in the vehicle width direction and is displaced in an up-down direction.

7. The vehicle according to claim 1, further comprising a floor cross member that protrudes from the upper face of the floor panel and extends from the rocker toward the vehicle inward side, wherein a front end of the first reinforcing member is fixed to the floor cross member.

* * * * *